6611½X
A. McGreer,
Railroad and Car,
X6611½
Patented June 30, 1851.
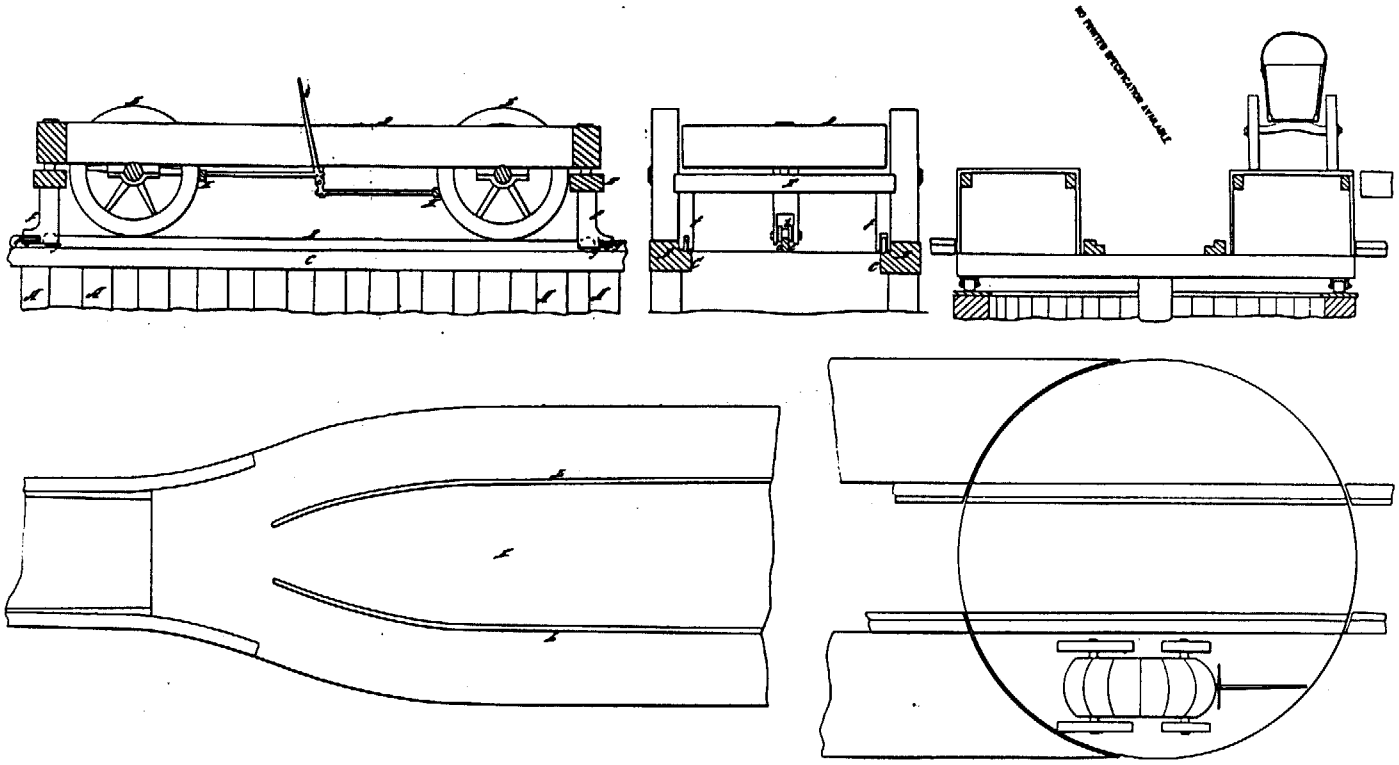
NO PRINTED SPECIFICATION AVAILABLE June 30, 1831 199.

Alexander McGrew of Cincinnati Ohio –
Letters Patent 6611½ X

The schedule referred to in these Letters Patent and making part of the same, containing a description in the words of the said Alexander McGrew himself of his improvement in railways, and in the carriages for the same called the safety Rail way & Car –

~Be it known that I Alexander McGrew of Cincinnati, in the County of Hamilton & State of Ohio, have made an improvement in Rail ways, and in the carriages for the same called the safety rail way & car; which is described as follows.. The Rail way is constructed by placing posts firmly in the ground of a proper degree of strength at any convenient distances, and so as to produce a plane to receive the rails to be next described. When the earth is not sufficiently firm to receive and secure the posts, stones may be put at the bottom of the holes. The rails may be of wood or iron, of a suitable size and strength: having a projection or rib rabbeted out or fastened on near the top against which the friction rollers of the guard arm of the carriage (to be hereafter described) turn; these rails are fastened firmly on the tops of the posts. –

The carriage is adapted to the width of the rail way: and consists of a frame in which four or more plain wheels with their axles are made to turn in boxes. At each end of the carriage is constructed another frame, having two arms with bends or angles, turning on an axle fixed in the first mentioned frame. At the extremity of each of these arms are fixed two friction wheels or rollers, one turning horizontally against the sides of the rails and the other vertically against the guard projection, or bar on the rails before mentioned to prevent the carriage from flying off the rails – –

Between the wheels of the carriage, and in the centre, are placed two spring stops, turning on an axle and having a bar or lever for turning them and causing them to rub or impinge against the wheels for regulating their speed or stopping them altogether; by which means all the wheels are pressed against by moving the same lever. –

To enable carriages to pass each other on the rail, [illegible] an intermediate platform about double the width of the rail way is supported by posts in the manner before

6611½X described. At the commencement of it is an inclined plane against which
the vertical friction wheels placed at each end of the carriage turn and ascend
the platform. On the top of the platform is a guide rail upon and against which
a grooved wheel and friction rollers turn and which serve to guide the carriage
on the platform whilst turning out. This platform may be of any convenient
length and immerges into a double track — —

To suffer carts and carriages to cross the rail way: and also for loading the
carriage, a turning platform is erected, by first driving a number of posts in the
ground forming a circle and having a post in the middle forming a centre,
on which the revolving platform is to rest and turn —

The revolving platform is made sufficiently strong & thick to bear the weight
of a loaded wagon & to be in the same plane with the bed of the carriage.
On the underside of the revolving platform are placed friction rollers, revolving
on a board fixed on the heads of the posts, forming the circle round the centre
post on which the revolving platform turns. Aprons hung on hinges will be
attached to this revolving platform, or the rail way carriage, to cover the open-
ing if any left between it & the revolving platform — — —

The Rail way carriage will have a bed erected upon it of sufficient size
and strength to receive wagons loaded with hay or any other article without
derangement of the load — Operation — —

The carriage having been placed on the rail way, and the load placed on
the platform, the propelling power is applied, and the carriage moved for-
ward; the main plain wheels turning on the top of the rails. —

The small horizontal friction wheels below, turning against the sides of the rails;
and the smaller vertical friction wheels turning against the guard projection or
bars on the rails when necessary: thus the carriage would be kept on the rails
and moved forward in a straight line with much ease velocity and security. —

When it is required to let wagons, or any other carriages, cross the rail way
then they drive up an inclined plane upon the revolving platform, and are
thus turned round untill they come to the other inclined plane, connected with
the other side of the road, and there descend and pursue their journey along
the common road —

Also when it is required to load the rail way carriage it is only necessary to drive the load up the inclined plane upon the revolving platform. The platform is then turned and the carriage, together with the load is transferred to the rail-road carriage –

What I claim as my invention is the construction of the rail way with a guard or projecting piece – the vertical friction wheels: the guard arms of the carriage – the turning out platform: and the revolving platform for crossing roads & loading the rail-way carriage.

In witness that the foregoing is a full and true description of my invention, I hereunto subscribe my name in presence of two witnesses – –

Witnesses,
William P. Elliot
L. Warren Ruggles

Z

Alexr. McGrew

Exd
[illegible]

966 words